United States Patent
Ito et al.

(10) Patent No.: US 10,800,658 B2
(45) Date of Patent: Oct. 13, 2020

(54) LAMINATED BODY

(71) Applicants: LINTEC Corporation, Tokyo (JP); LINTEC OF AMERICA, INC., Phoenix, AZ (US)

(72) Inventors: Masaharu Ito, Phoenix, AZ (US); Raquel Ovalle, Phoenix, AZ (US)

(73) Assignees: LINTEC OF AMERICA, INC., Phoenix, AZ (US); LINTEC CORPORATION, Tokyo (JP)

( * ) Notice: Subject to any disclaimer, the term of this patent is extended or adjusted under 35 U.S.C. 154(b) by 0 days.

(21) Appl. No.: 15/563,245

(22) PCT Filed: Mar. 18, 2016

(86) PCT No.: PCT/JP2016/058704
§ 371 (c)(1),
(2) Date: Sep. 29, 2017

(87) PCT Pub. No.: WO2016/158496
PCT Pub. Date: Oct. 6, 2016

(65) Prior Publication Data
US 2018/0086642 A1    Mar. 29, 2018

Related U.S. Application Data

(60) Provisional application No. 62/140,871, filed on Mar. 31, 2015.

(51) Int. Cl.
*B32B 9/00* (2006.01)
*C01B 32/168* (2017.01)
(Continued)

(52) U.S. Cl.
CPC ............ *C01B 32/168* (2017.08); *B32B 9/045* (2013.01); *B82Y 30/00* (2013.01); *B82Y 40/00* (2013.01);
(Continued)

(58) Field of Classification Search
CPC .... Y10T 428/408; C01B 31/022–0293; B82Y 30/00
(Continued)

(56) References Cited

U.S. PATENT DOCUMENTS

2003/0122111 A1* 7/2003 Glatkowski ............ B82Y 10/00
                                                                252/500
2005/0186333 A1* 8/2005 Douglas ................. B82Y 30/00
                                                                427/97.1
(Continued)

FOREIGN PATENT DOCUMENTS

CN          1480323 A      3/2004
CN        101863150 A     10/2010
(Continued)

OTHER PUBLICATIONS

English translation of International Preliminary Report on Patentability issued in corresponding International Patent Application No. PCT/JP2016/058704, dated Oct. 3, 2017.
(Continued)

*Primary Examiner* — Daniel H Miller
(74) *Attorney, Agent, or Firm* — McDermott Will & Emery LLP

(57) ABSTRACT

A laminate includes: a carbon nanotube sheet including a plurality of carbon nanotubes aligned preferentially in one direction within a plane of the sheet; and a first protection material having a surface in contact with the carbon nanotube sheet, the surface having a surface roughness $Ra_1$ of 0.05 μm or more.

10 Claims, 2 Drawing Sheets

(51) Int. Cl.
*B32B 9/04* (2006.01)
*B82Y 30/00* (2011.01)
*B82Y 40/00* (2011.01)
*B32B 37/12* (2006.01)

(52) U.S. Cl.
CPC ........... *B32B 37/12* (2013.01); *B32B 2313/04* (2013.01); *C01B 2202/08* (2013.01); *Y10T 428/30* (2015.01)

(58) Field of Classification Search
USPC .......................................... 428/408; 423/448
See application file for complete search history.

(56) References Cited

U.S. PATENT DOCUMENTS

| 2007/0102048 A1* | 5/2007 | Bravo | F16K 1/126 137/495 |
| 2007/0103048 A1* | 5/2007 | Liu | B82Y 10/00 313/311 |
| 2011/0111177 A1 | 5/2011 | Hata et al. | |
| 2013/0134427 A1* | 5/2013 | Ushikura | H01L 51/0545 257/59 |

FOREIGN PATENT DOCUMENTS

| CN | 1959896 B | 3/2011 |
| CN | 102199403 A | 9/2011 |
| CN | 102306800 A | 1/2012 |
| CN | 104040639 A | 9/2014 |
| EP | 2 207 189 A1 | 7/2010 |
| JP | 2012-213716 A | 11/2012 |
| JP | 5255021 B2 | 8/2013 |
| JP | 2014-208560 A | 11/2014 |
| WO | 2009/107846 A1 | 9/2009 |

OTHER PUBLICATIONS

Search Report issued in corresponding International Patent Application No. PCT/JP2016/058704, dated May 17, 2016.
Daihua Zhang et al., "Transparent, conductive, and flexible carbon nanotube films and their application in organic light-emitting diodes", Nano Letters, American Chemical Society, US, vol. 6, No. 9, Jul. 1, 2006, pp. 1880-1886.
Zhou Yangxin et al., "A method of printing carbon nanotube thin films", Applied Physics Letters, AIP Publishing LLC, US, vol. 88, No. 12, Mar. 22, 2006, pp. 123109-123109.
Goerlitz W. et al., "Substrates for flexible magnetic recording media: The role of base films for modem performance requirements", Journal of Magnetism and Magnetic Materials, Elsevier, Amsterdam, NL, vol. 120, No. 1-3, Mar. 1, 1993, pp. 76-82.
European Search Report issued in corresponding European Patent Application No. 16772378.2, dated Oct. 24, 2018.
Office Action issued in corresponding Taiwanese Application No. 105109860, dated Apr. 24, 2019, with English translation.
Office Action issued in corresponding Chiinese Patent Application No. 201680019426.9, dated Jul. 2, 2019, with English translation.

* cited by examiner

LAMINATED BODY

CROSS REFERENCE

This application is the U.S. National Phase under 35 US.C. § 371 of International Application No. PCT/JP2016/058704, filed on Mar. 18, 2016, which claims the benefit of U.S. Provisional Patent Application No. 62/140,871, filed on Mar. 31, 2015, the entire contents of each are hereby incorporated by reference.

TECHNICAL FIELD

The present invention relates to a laminate.

BACKGROUND ART

A sheet of carbon nanotubes has been known.

Patent Literature 1 discloses a carbon nanotube structure including a protection structure, which includes at least one drawn carbon nanotube film, a base and a coating film.

CITATION LIST

Patent Literature(s)

Patent Literature 1: JP-B-5255021

SUMMARY OF THE INVENTION

Problem(s) to be Solved by the Invention

A carbon nanotube sheet is sometimes provided in the form of a laminate employing, for instance, a release film as a base so that the carbon nanotube sheet can be easily handled to be provided.

However, some bases cannot allow for, for instance, easy removal of a carbon nanotube sheet, so that a problem such as defect is caused to the carbon nanotube sheet.

An object of the invention is to provide a laminate capable of preventing a problem caused on a carbon nanotube sheet.

Means for Solving the Problem(s)

According to an aspect of the invention, a laminate includes: a carbon nanotube sheet including a plurality of carbon nanotubes aligned preferentially in one direction within a plane of the sheet; and a first protection material having a surface in contact with the carbon nanotube sheet, the surface having a surface roughness $Ra_1$ of 0.05 μm or more.

In the above aspect, it is preferable that the surface roughness $Ra_1$ of the first protection material surface is 10 μm or less.

The above aspect(s) of the invention provides a laminate capable of preventing a problem caused on a carbon nanotube sheet.

BRIEF DESCRIPTION OF DRAWING(S)

DESCRIPTION OF EMBODIMENT(S)

Laminate

First Exemplary Embodiment

Figure 1:
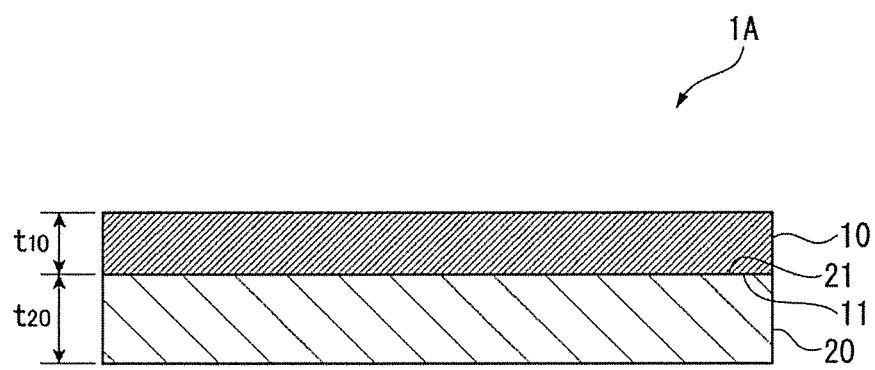
FIG. 1 is a sectional view showing a laminate according to a first exemplary embodiment of the invention.

As shown in FIG. 1, a laminate 1A according to a first exemplary embodiment of the invention includes a carbon nanotube sheet 10 and a first protection material 20. In the laminate 1A according to the first exemplary embodiment, a first CNT sheet surface 11 of the carbon nanotube sheet 10 is in contact with a first protection material surface 21 of the first protection material 20.

Carbon Nanotube Sheet

The carbon nanotube sheet 10 includes a plurality of carbon nanotubes that are preferentially aligned in one direction defined in a plane of the sheet.

It should be noted that "the carbon nanotubes are aligned in a direction defined in a plane of the sheet" herein means that the carbon nanotubes are aligned along a direction defined in a plane of the sheet. For instance, the longitudinal axes of the carbon nanotubes are aligned in parallel with a direction defined in a plane of the sheet.

Further, "carbon nanotubes are preferentially aligned" herein means that the majority of the carbon nanotubes are aligned in the above manner. For instance, as long as the majority of the carbon nanotubes are aligned with the longitudinal axes thereof being in parallel with a direction defined in a plane of the sheet, a part of the carbon nanotubes may be aligned with the longitudinal axes thereof not in parallel with the direction defined in the plane of the sheet.

The carbon nanotube sheet 10 is produced by, for instance, drawing carbon nanotubes agglomerated by an intermolecular force into a sheet from a carbon nanotube forest (i.e., a grown form, which is occasionally referred to as "array", of a plurality of carbon nanotubes grown on a substrate to be vertically aligned relative to the substrate) and separating the drawn carbon nanotubes from the substrate.

A thickness of the carbon nanotube sheet 10 is appropriately determined depending on the intended use. For instance, in terms of ensuring a high transparency of the carbon nanotube sheet 10 and/or regulating the electrical sheet resistance of the carbon nanotube sheet 10, a thickness $t_{10}$ of the carbon nanotube sheet 10 (see FIG. 1) is preferably in a range from 0.01 μm to 100 μm and more preferably in a range from 0.05 μm to 75 μm.

First Protection Material

A surface of the first protection material 20 (the first protection material surface 21) in contact with the carbon nanotube sheet 10 has a surface roughness (arithmetic mean estimation) $Ra_1$ of 0.05 μm or more.

When the surface roughness $Ra_1$ of the first protection material surface 21 is 0.05 μm or more, the carbon nanotube sheet 10 can be easily removed from the first protection material 20 (i.e., a base) without being ruptured.

The surface roughness $Ra_1$ of the first protection material surface 21 is preferably 0.1 μm or more and more preferably 0.15 μm or more.

It should be noted that the surface roughness herein is a value measured using a contact profilometer according to JIS B0633: 2001.

The surface roughness $Ra_1$ of the first protection material surface 21 is preferably 10 μm or less.

When the surface roughness $Ra_1$ of the first protection material surface 21 is 10 μm or less, the smoothness of the surface (the first protection material surface 21) of the first protection material 20 (the base) is adequately maintained, thereby suppressing occurrence of a problem such as breakage of the carbon nanotube sheet 10 due to unevenness of the first protection material surface 21.

The surface roughness $Ra_1$ of the first protection material surface 21 is more preferably 5 μm or less and further more preferably 3 μm or less.

The surface roughness $Ra_1$ of the first protection material surface 21 can be adjusted to fall within the above range by, for instance, any one of the following processes: adding a particulate material in a material for the first protection material surface 21 (e.g., resin); in a melt-molding process of a material for the first protection material surface 21 (e.g., resin), ejecting a molten material onto a roll or the like with unevenness to provide unevenness to the first protection material surface 21; providing unevenness to the first protection material surface 21 by a physical shaping process (e.g., sandblasting and polishing); and providing unevenness to the first protection material surface 21 by mixing two materials with low compatibility with each other and forming a coating film by coating, drying or the like to establish a discontinuous structure of one of the materials in a continuous structure of the other material. Examples of the particulate material include an inorganic filler such as a silica filler and an organic filler such as polymethylmethacrylate filler.

The first protection material 20 is not particularly limited as long as the first protection material 20 is a sheet member with a surface roughness in the above range. Examples of the first protection material 20 include resin films such as a polyethylene film, polypropylene film, polybutene film, polybutadiene film, polymethylpentene film, polyvinyl chloride film, vinyl chloride copolymer film, polyethylene terephthalate film, polyethylene naphthalate film, polybutylene terephthalate film, polyurethane film, ethylene vinyl acetate copolymer film, ionomer resin film, ethylene•(meth) acrylic acid copolymer film, ethylene•(meth)acrylic acid ester copolymer film, polystyrene film, polycarbonate film, polyimide film and fluorocarbon resin film. The first protection material 20 may also be a metal foil (e.g., aluminum, copper and gold) or a glass sheet.

Examples of the first protection material 20 also include papers such as a cooking paper, oilproof paper, glassine paper and parchment paper, which may be commercially available products.

Among the above examples, resin is preferable in terms of easiness in adjusting the surface roughness and, further, a polyester film or a polyolefine film is more preferable in terms of availability.

A thickness $t_{20}$ of the first protection material 20 (see FIG. 1) is preferably in a range from 10 μm to 300 μm, more preferably in a range from 15 μm to 200 μm, and further more preferably in a range from 25 μm to 150 μm in terms of protecting the carbon nanotube sheet 10 and ensuring handleability of the carbon nanotube sheet 10.

It should be noted that a total thickness ($t_{10}+t_{20}$) of the entire laminate 1A is preferably in a range from 11 μm to 400 μm.

Manufacturing Method of Laminate

A manufacturing method of the laminate 1A is not particularly limited.

For instance, the laminate 1A may be manufactured through the following process.

A forest of carbon nanotubes is first formed on a substrate such as a silicon wafer by a known method. Subsequently, an end of the forest is twisted and drawn with tweezers or the like to be separated from the substrate. A carbon nanotube sheet is thus manufactured.

A surface of a first protection material (i.e., a surface with the surface roughness $Ra_1$ in the above range) is stuck on a surface of the manufactured carbon nanotube sheet, thereby providing the laminate 1A.

The laminate according to the first exemplary embodiment has excellent handleability, and the carbon nanotube sheet can be removed from the protection material without any problem in use.

Second Exemplary Embodiment

Description will be made on an arrangement of a laminate according to a second exemplary embodiment. In the description of the second exemplary embodiment, the like reference signs, names or the like are attached to the same components as those of the first exemplary embodiment and explanation thereof is omitted or simplified. Further, in the second exemplary embodiment and a specific example(s) thereof, the same arrangements and the like as ones described in the first exemplary embodiment may be employed as long as they are not particularly described.

Figure 2:
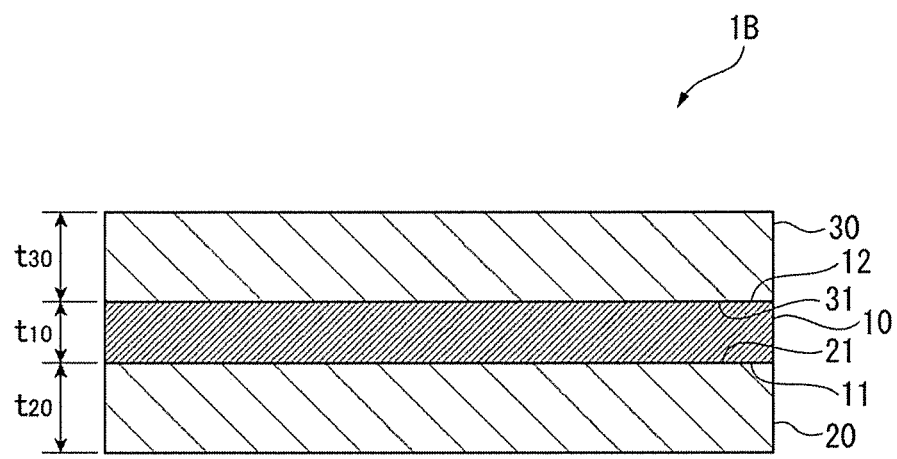
FIG. 2 is a sectional view showing a laminate according to a second exemplary embodiment of the invention.

As shown in FIG. 2, a laminate 1B according to the second exemplary embodiment includes a carbon nanotube sheet 10, a first protection material 20 and a second protection material 30. In the laminate 1B according to the second exemplary embodiment, a first CNT sheet surface 11 of the carbon nanotube sheet 10 is in contact with a first protection material surface 21 of the first protection material 20. Similarly, a surface (a second CNT sheet surface 12) of the carbon nanotube sheet 10 opposite to the surface in contact with the first protection material (the first CNT sheet surface 11) is in contact with a second protection material surface 31 of the second protection material 30. The protection materials (the first protection material 20 and the second protection material 30) on both surfaces of the carbon nanotube sheet 10 improve the handleability of the laminate 1B and a protection performance on the carbon nanotube sheet 10.

A surface roughness $Ra_1$ of the first protection material surface 21 of the first protection material 20 is 0.05 μm or more.

When the surface roughness $Ra_1$ of the first protection material surface 21 is 0.05 μm or more, the carbon nanotube sheet 10 can be easily removed from the first protection material 20 (i.e., a base) without being ruptured.

The surface roughness $Ra_1$ of the first protection material surface 21 is preferably 0.1 μm or more and more preferably 0.15 μm or more.

The surface roughness $Ra_1$ of the first protection material surface 21 is preferably 10 μm or less.

When the surface roughness $Ra_1$ of the first protection material surface 21 is 10 μm or less, the smoothness of the surface (the first protection material surface 21) of the first protection material 20 (the base) is adequately maintained, thereby suppressing occurrence of a problem such as breakage of the carbon nanotube sheet 10 due to unevenness of the first protection material surface 21.

The surface roughness $Ra_1$ of the first protection material surface 21 is more preferably 5 μm or less and further more preferably 3 μm or less.

A surface roughness $Ra_2$ of the surface of the second protection material 30 (the second protection material surface 31) in contact with the carbon nanotube sheet 10 is preferably larger than the surface roughness $Ra_1$ of the first protection material surface 21 of the first protection material 20. A difference between the surface roughness $Ra_1$ of the first protection material surface 21 of the first protection material 20 and the surface roughness $Ra_2$ of the second protection material surface 31 of the second protection material 30 is preferably 0.05 μm or more.

When the difference between the surface roughness $Ra_1$ of the first protection material surface 21 of the first protection material 20 and the surface roughness $Ra_2$ of the second protection material surface 31 of the second protection material 30 is 0.05 μm or more, one of the first protection material 20 and the second protection material 30 can be removed first without a part of the carbon nanotube sheet 10 remaining on the one removed first. Rupture of the carbon nanotube sheet 10 can thus be prevented.

The difference between the surface roughness $Ra_1$ of the first protection material surface 21 of the first protection material 20 and the surface roughness $Ra_2$ of the second protection material surface 31 of the second protection material 30 is preferably 0.08 μm or more and more preferably 0.10 μm or more.

The surface roughness $Ra_2$ of the second protection material surface 31 of the second protection material 30 is preferably 0.1 μm or more, more preferably in a range from 0.1 μm to 10 μm, further preferably in a range from 0.13 μm to 5 μm, and further more preferably in a range from 0.15 μm to 3 μm.

When the surface roughness $Ra_2$ of the second protection material surface 31 is in the above range, the carbon nanotube sheet 10 can be easily removed from the second protection material 30 without being ruptured, and a problem such as breakage of the carbon nanotube sheet 10 due to unevenness of the second protection material surface 31 can be restrained.

A material for the second protection material 30 is not particularly limited, and the materials listed as the material for the first protection material 20 are usable.

A thickness $t_{30}$ of the second protection material 30 (see FIG. 2) is preferably in a range from 10 μm to 300 μm, more preferably in a range from 15 μm to 200 μm, and further more preferably in a range from 25 μm to 150 μm in terms of protecting the carbon nanotube sheet 10 and ensuring handleability of the carbon nanotube sheet 10.

It should be noted that a total thickness $(t_{10}+t_{20}+t_{30})$ of the entire laminate 1B is preferably in a range from 21 μm to 700 μm.

The laminate according to the second exemplary embodiment has excellent handleability, and the carbon nanotube sheet can be removed from the protection material without any problem in use.

Modifications of Exemplary Embodiment(s)

The scope of the invention is not limited to the above-described exemplary embodiment(s) but includes modifications and improvements compatible with the invention. It should be noted that the like reference signs are attached to the same members and the like as those of the exemplary embodiment(s) and explanation thereof is omitted or simplified hereinbelow.

For instance, the laminate according to the exemplary embodiment(s) may include a laminate of a plurality of layers of carbon nanotube sheets and protection materials that are alternately laminated. Such a laminate may be provided by a plurality of laminates 1A of the first exemplary embodiment laminated on one another. In this case, a surface roughness $Ra_3$ of a surface of the first protection material 20 opposite to the first protection material surface 21 (i.e., a surface of the first protection material 20 in contact with a laminated carbon nanotube sheet of the laminate subsequently laminated thereon) is preferably 0.05 μm or more and more preferably in a range from 0.05 μm to 10 μm. Further, it is preferable that the surface roughness $Ra_1$ of the first protection material surface 21 and the surface roughness $Ra_3$ of the surface of the first protection material 20 opposite to the first protection material surface 21 are not equal and a difference therebetween are 0.05 μm or more.

For instance, the laminate may be sheeted or rolled.

It should be noted that, for instance, when a laminate with a surface of the carbon nanotube sheet being exposed such as the laminate 1A of the first exemplary embodiment is rolled, the carbon nanotube sheet is usually situated inside. Accordingly, in the case where the laminate 1A of the first exemplary embodiment is rolled, a surface roughness Ra(out) of a surface of the first protection material 20 opposite to the first protection material surface 21 (i.e., an outer surface of the first protection material 20 that is brought into contact with the carbon nanotube sheet 10 when the laminate is rolled) is preferably 0.05 μm or more and more preferably in a range from 0.05 μm to 10 μm. Further, it is preferable that the surface roughness $Ra_1$ of the first protection material surface 21 of the first protection material 20 and the surface roughness Ra(out) of the surface of the first protection material 20 opposite to the first protection material surface 21 (i.e., the outer surface of the first protection material 20 that is brought into contact with the carbon nanotube sheet 10 when the laminate is rolled) are not equal and a difference therebetween are 0.05 μm or more. More preferably, the surface roughness Ra(out) of the surface of the first protection material 20 opposite to the first protection material surface 21 (i.e., the outer surface of the first protection material 20 that is brought into contact with the carbon nanotube sheet 10 when the laminate is rolled) is larger than the surface roughness $Ra_1$ of the first protection material surface 21 of the first protection material 20.

When the laminate is provided by laminating a plurality of layers as described above, a surface roughness of the protection material may be determined as desired with reference to the above range.

EXAMPLE(S)

The invention will be described in further detail with reference to Example(s). The invention is, however, by no means limited by Example(s).

Manufacturing of Laminate

Example 1

Formation of Carbon Nanotube Forest

Using thermal chemical vapor deposition (CVD) equipment including three furnaces and using argon gas as a carrier gas and acetylene as a carbon source, a carbon nanotube forest was formed on a divided six-inch silicon wafer by catalytic chemical vapor deposition. A height of the carbon nanotube forest was 300 μm.

Formation of Carbon Nanotube Sheet

An end of the carbon nanotube forest was twisted and drawn with tweezers into a carbon nanotube sheet. The carbon nanotube sheet was held on two parallel support sticks (copper sticks with a 2-mm diameter) with the assistance of the self-adhesiveness of the sheet, and an unnecessary part was cut off. A free-standing (self-supported) carbon nanotube sheet held between the two support sticks was thus obtained.

Manufacturing of Laminate

The thus-obtained carbon nanotube sheet was stuck on a surface of a 50-μm-thick protection material a (manufactured by LINTEC Corporation, SP-PET50N MAT C) opposite to a release surface thereof (a surface with release properties) to form a laminate of the carbon nanotube sheet and the protection material a.

Example 2

Example 2 was the same as Example 1 except that a 48-μm-thick protection material b (a cooking paper, manufactured by BRADSHAW INTERNATIONAL. INC., goodcook parchment paper, nonstick type) was used in place of the protection material a, and a laminate of a carbon nanotube sheet and the protection material b was obtained.

Comparative Example 1

Comparative Example 1 was the same as Example 1 except that a 38-μm-thick protection material c (a fluoric release film, manufactured by LINTEC Corporation, SP-PET38E-0010YC) was used in place of the protection material a, and a laminate of a carbon nanotube sheet and the protection material c was obtained. It should be noted that a fluorine surface of the protection material c (a surface subjected to a fluorine treatment) was stuck on the carbon nanotube sheet.

Measurement of Surface Roughness of Protection Material

The surface roughness of the protection material used in each of Examples and Comparative Example (the surface roughness of a contact surface on the carbon nanotube sheet) was measured in advance using a contact profilometer (manufactured by Mitutoyo Corporation, SURF TEST SV-3000) according to JIS B 0633:2001.

Evaluation of Laminate

Evaluation of Release Performance for Releasing Carbon Nanotube Sheet

The carbon nanotube sheet of the laminate of each of Examples 1 and 2 and Comparative Example 1 was removed from the first protection material by pinching and pulling an end of a commercially available adhesive sheet stuck on an end of the carbon nanotube sheet. When the carbon nanotube sheet was removed without being ruptured, the release performance was ranked as A. When the carbon nanotube sheet was ruptured, the release performance was ranked as B. Table 1 shows the results.

TABLE 1

| | First Protection Material | | |
|---|---|---|---|
| | Type | Surface Roughness $Ra_1$ (μm) | Release Performance (when carbon nanotube sheet is removed) |
| Ex. 1 | a | 0.2404 | A |
| Ex. 2 | b | 2.0401 | A |
| Comp. 1 | c | 0.0199 | B |

As shown in Table 1, it has been demonstrated that the carbon nanotube sheets of the laminates of Examples 1 and 2 are removed from the first protection materials without being ruptured.

In contrast, in Comparative Example 1 where the surface roughness $Ra_1$ of the contact surface of the carbon nanotube sheet on the first protection material is less than 0.05 μm, it has been demonstrated that the carbon nanotube sheet is ruptured during being removed.

The invention claimed is:

1. A laminate comprising:
a carbon nanotube sheet comprising a plurality of carbon nanotubes; and
a first protection material having a surface in contact with the carbon nanotube sheet,
wherein the surface of the first protection material has a surface roughness $Ra_1$ of 0.05 μm or more, and
wherein a longitudinal axis of each of the plurality of carbon nanotubes is aligned in parallel with each other and with the surface of the first protection material.

2. The laminate according to claim 1 wherein the surface roughness $Ra_1$ of the first protection material is 10 μm or less.

3. The laminate according to claim 1, wherein a thickness of the carbon nanotube sheet is in a range from 0.01 μm to 100 μm.

4. The laminate according to claim 1, wherein a thickness of the first protection material is in a range from 10 μm to 300 μm.

5. The laminate according to claim 1, wherein a total thickness of the laminate is in a range from 11 μm to 400 μm.

6. The laminate according to claim 1, further comprising a second protection material being in contact with the carbon nanotube sheet opposite the first protection material.

7. The laminate according to claim 6, wherein a total thickness of the laminate is in a range from 21 μm to 700 μm.

8. The laminate according to claim 6, wherein the second protection material has a surface being in contact with the carbon nanotube sheet, the surface having a surface roughness $Ra_2$ larger than the surface roughness $Ra_1$ of the first protection material.

9. The laminate according to claim 8, wherein a difference between the surface roughness $Ra_2$ of the second protection material and the surface roughness $Ra_1$ of the first protection material is 0.05 μm or more.

10. The laminate according to claim 8, wherein the surface roughness $Ra_2$ is in a range from 0.1 μm to 10 μm.

* * * * *